United States Patent
Naiki

Patent Number: 5,113,291
Date of Patent: May 12, 1992

[54] OPTICAL AXIS AND FOCUS ADJUSTMENT MECHANISM FOR SEMICONDUCTOR LASER AND COLLIMATOR LENS

[75] Inventor: Toshio Naiki, Osaka, Japan

[73] Assignee: Minolta Camera Kabushiki Kaisha, Osaka, Japan

[21] Appl. No.: 335,042

[22] Filed: Apr. 7, 1989

[30] Foreign Application Priority Data

Apr. 8, 1988 [JP] Japan ................. 63-87732

[51] Int. Cl.$^5$ .................. G02B 7/02; G02B 26/08
[52] U.S. Cl. .................. 359/823; 359/198; 359/827
[58] Field of Search .......... 350/245–257, 350/417, 321, 580, 581; 354/286; 285/394–396; 248/228, 278, 317, 415, 418; 359/198–200, 224–226, 811–830, 896

[56] References Cited

U.S. PATENT DOCUMENTS

| | | | |
|---|---|---|---|
| 4,281,895 | 8/1981 | Mohr | 350/257 |
| 4,408,830 | 10/1983 | Wutherich | 350/252 |
| 4,415,235 | 11/1983 | Coates | 350/252 |
| 4,496,416 | 1/1985 | Mächler et al. | 350/417 |
| 4,498,737 | 2/1985 | Doggett | 350/255 |
| 4,762,395 | 8/1988 | Gordon et al. | 350/252 |
| 4,786,143 | 11/1988 | Vial et al. | 350/252 |
| 4,832,452 | 5/1989 | Eisler | 350/247 |
| 4,856,870 | 8/1989 | Berkers | 350/255 |
| 4,926,433 | 5/1990 | Imamura et al. | 372/50 |

FOREIGN PATENT DOCUMENTS

| | | | |
|---|---|---|---|
| 341936 | 11/1989 | European Pat. Off. | 350/255 |
| 62-205305 | 9/1987 | Japan . | |
| 8404991 | 12/1984 | PCT Int'l Appl. | 350/247 |

*Primary Examiner*—Bruce Y. Arnold
*Assistant Examiner*—Thong Nguyen
*Attorney, Agent, or Firm*—Price, Gess & Ubell

[57] ABSTRACT

A focus and optical axis adjustment mechanism for a semiconductor laser and a collimator lens is disclosed. A first holding member for holding a semiconductor laser is attached to an intermediate member so that it is movable on a plane vertical to the optical axis of the semiconductor laser. The intermediate member is attached to a second holding member which holds a collimator lens so that it can be bent with a portion near one end thereof as the bending line.

10 Claims, 7 Drawing Sheets

OPTICAL AXIS AND FOCUS ADJUSTMENT MECHANISM FOR SEMICONDUCTOR LASER AND COLLIMATOR LENS

BACKGROUND OF THE INVENTION (1) Field of the Invention

The present invention relates to an optical axis and focus adjustment mechanism for a semiconductor laser and a collimator lens for use in a laser scanning apparatus employed in a laser beam printer or the like.

(2) Description of the Related Art

A laser scanning apparatus provided with a semiconductor laser and a collimator lens is employed in a laser beam printer, a laser scanner or the like. Generally, a laser beam is radially emitted from a semiconductor laser and is converted into a parallel beam by a collimator lens for scanning. Since a focal length of the collimator lens is extremely shorter than that of an image-forming optical system which forms an image on an image carrier, a slight error in positioning the semiconductor laser leads to a considerable error on the image carrier.

In a laser beam printer and so on, such an error causes a recorded image to be blurred. Accordingly, it is required to position the semiconductor laser on the focus of the collimator lens (referred to as a focus adjustment hereinafter) and to position the semiconductor laser so that the optical axis of the laser beam coincides with the optical axis of the collimator lens (referred to as a optical axis adjustment hereinafter).

FIG. 1 is a plan view of a typical example of a conventional optical axis and focus adjustment mechanism. FIG. 2 is a cross section taken along the line II—II of FIG. 1 and FIG. 3 is an exploded perspective view. A mechanism 1 comprises a holding member 3 for holding a semiconductor laser 2 and a holding member 5 for holding a collimator lens 4. The holding member 3 has through holes 7a, 7b and 7c for receiving adjusting screws 6a, 6b and 6c loosely and has a screw hole 9 into which an adjusting screw 8 is screwed. On the other hand, the holding member 5 is provided with bosses 10a, 10b and 10c which have screw holes 11a, 11b and 11c, respectively. The adjusting screws 6a, 6b and 6c are inserted through the through holes 7a, 7b and 7c and are screwed into the screw holes 11a, 11b and 11c. The adjusting screw 8 is screwed into the screw hole 9 until its tip comes into contact with a surface of the holding member 5. The holding members 3 and 5 are energized by a spring 12 causing them to approach each other.

In the mechanism having the above construction, the optical axis adjustment is effected as follows. First, the adjusting screws 6a, 6b and 6c are loosened to move the holding member 3 on a plane vertical to the optical axis of the collimator lens 4. When the center of the semiconductor laser is positioned to be on the optical axis of the collimator lens, the adjusting screws 6a, 6b and 6c are tightened again to fix the holding member 3 to the holding member 5. Thus, the optical axis adjustment is completed.

In the focus adjustment, the adjusting screw 8 is screwed into the screw hole 9 to bend the holding member 3, whereby the distance between the semiconductor laser 2 and collimator lens 4 is adjusted in the direction of the optical axis.

The above mechanism, however, has the following problem. That is, the holding member 5 gets scratches on its surface at the time of the focus adjustment because the tip of the screw 8 is in contact with the surface. If the optical axis adjustment is effected after the focus adjustment, the tip of the adjusting screw 8 is caught in the above scratches, which hampers a smooth movement of the holding member 3 on the plane vertical to the optical axis.

In order to solve the above problem, it is conceivable to effect the optical axis adjustment prior to the focus adjustment. In this case, however, the focus adjustment affects the position of the semiconductor laser because the distance between the bending line of the holding member 3 and the semiconductor laser 2 is short. That is, according to the conventional technique, the focus adjustment and the optical axis adjustment are dependent on each other. Therefore, it has been impossible to effect these adjustments through a simple operation with high accuracy.

SUMMARY OF THE INVENTION

A primary object of the present invention, therefore, is to provide a useful mechanism capable of effecting a optical axis adjustment and a focus adjustment individually.

Another object of the present invention is to provide a mechanism capable of effecting the above adjustments through a simple operation with high accuracy.

The above objects are fulfilled, according to the present invention, by a focus and optical axis adjustment mechanism for two optical components comprising a first holding member for holding a first optical component, a second holding member for holding a second optical component, an intermediate member disposed between the first and second holding members, which is attached to the second holding member so that the intermediate member can be bent with a portion near one end thereof as the bending line and to which the first holding member is attached so that the first holding member is movable within a plane vertical to the optical axis of the first optical component.

The first optical component may be a semiconductor laser and the second optical component may be a collimator lens.

The intermediate member may be fixed to the second holding member at one end thereof and a portion adjacent the fixed end is thinner than the remaining portion to serve as the bending line.

The intermediate member may be of a substantially rectangular shape and may be engaged with the first and second holding members at positions near opposite ends thereof in the longitudinal direction.

The intermediate member may have the first holding member attached thereto at a position near the opposite end from the bending line.

A construction for allowing the first holding member attached to the intermediate member to move within the plane vertical to the optical axis of the first optical component may include screws for fixing the first holding member to the intermediate member and through holes for receiving the screws loosely.

The intermediate member may have a hole through which the first and second optical components face each other.

The intermediate member and second holding member may be separated from each other by force of a coil spring and approach each other by means of a screw.

According to the above construction, the first holding member attached to the intermediate member is movable within a plane vertical to the optical axis of the laser beam. The optical axis adjustment is effected by moving the first holding member within the above plane.

The intermediate member attached to the second holding member can be bent with a portion near one end thereof as the bending line. The focus adjustment is effected by bending the intermediate member toward or away from the second holding member and adjusting the distance between the semiconductor laser and the collimator lens.

As described above, the optical axis adjustment is effected between the first holding member and the intermediate member, and the focus adjustment is between the intermediate member and the second holding member. Therefore, the two adjustments do not interfere with each other.

and a result, as distinct from the conventional technique, the focus adjustment and the optical axis adjustment can be effected through a simple operation with high accuracy.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENT

Figure 1:
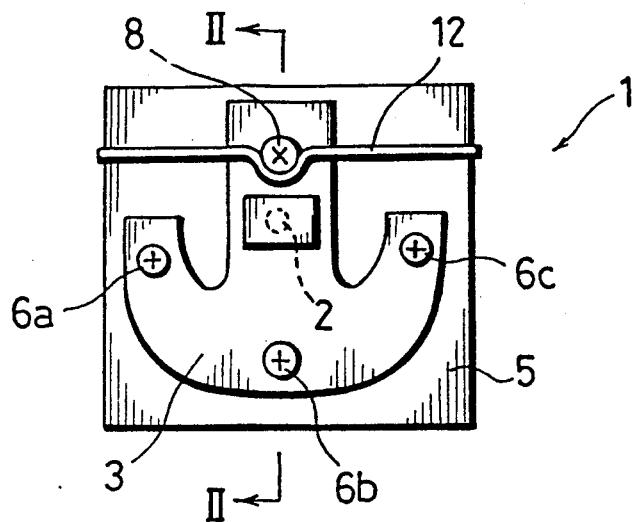
FIG. 1 is a front view of a conventional focus and optical axis adjustment mechanism.
Figure 2:
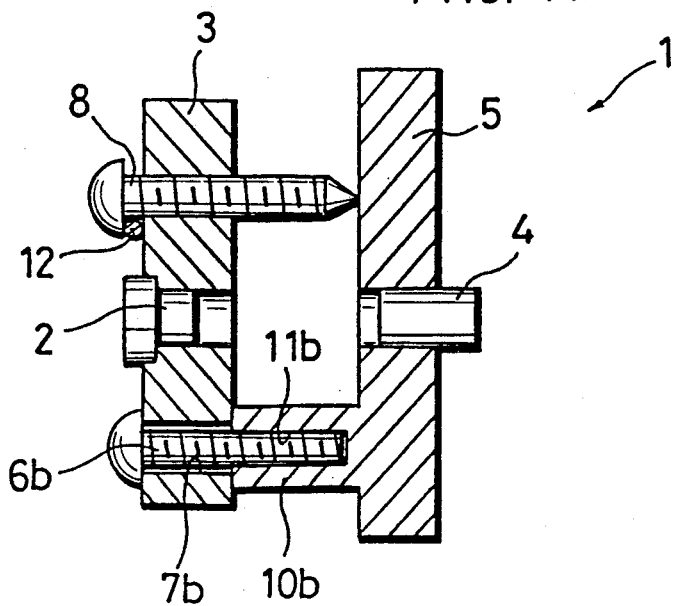
FIG. 2 is a cross section taken along the line II—II of FIG. 1.
Figure 3:
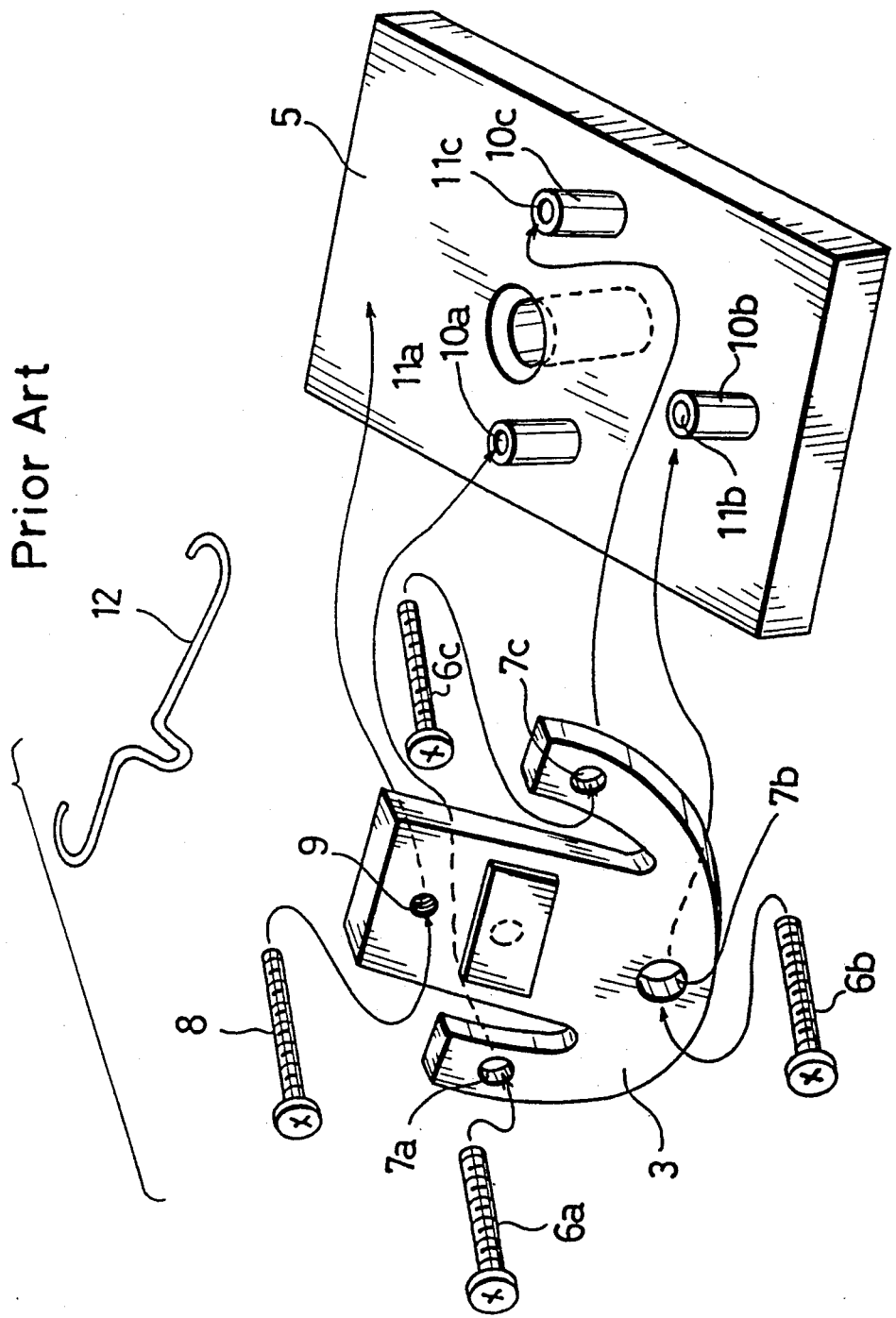
FIG. 3 is an exploded perspective view of the above mechanism.
Figure 4:
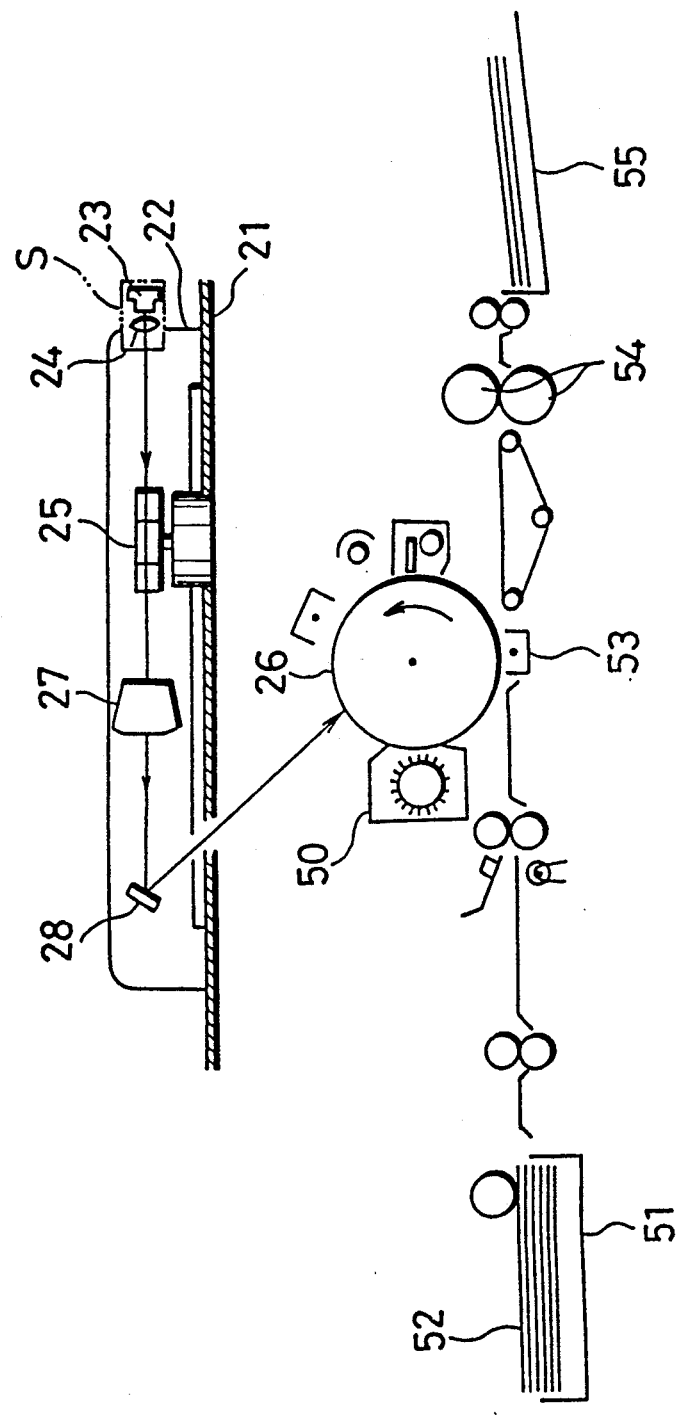
FIG. 4 is a schematic cross section of a laser beam printer to which a focus and optical axis adjustment mechanism S according to the present invention is applied.

FIG. 4 is a schematic view of a laser beam printer provided with a focus and optical axis adjustment mechanism S according to the present invention. Number 21 indicates a mounting plate on which a case 22 for containing a laser scanning apparatus is mounted. On a side wall of this case 22 is disposed the mechanism S including a semiconductor laser 23 and a collimator lens 24. A laser beam is emitted from the semiconductor laser 23 while being modulated on the basis of the input image information and converted into a parallel beam by the collimator lens 24 to be directed to the polygon mirror 25 in rotation. Then, the laser beam is reflected by a reflecting surface of the polygon mirror 25 and is scanned along a longitudinal direction of a photoconductive drum 26.

The laser beam is converged by an of lens 27 and reflected by a turning mirror 28 to expose the photoconductive drum 26, thereby reducing the charge potential in the exposed region. The above scanning is repeated with rotation of the photoconductive drum 26, whereby an electrostatic latent image is formed on the photoconductive drum 26.

Thereafter, a developing device 50 adheres toner powders on the photoconductive drum 26 by static electricity to form a toner image corresponding to the electrostatic latent image. On the other hand, a recording paper 52 fed from a paper feeding cassette 51 is adhered on the toner image and the toner image is transferred thereon by a transferring charger 53. Then, the recording paper 52 is heat-fixed by a heatfixing device 54 and thus, an image corresponding to the input image information is recorded on the recording paper 52. The recording paper 52 is delivered into a delivery cassette 55.

Figure 5:
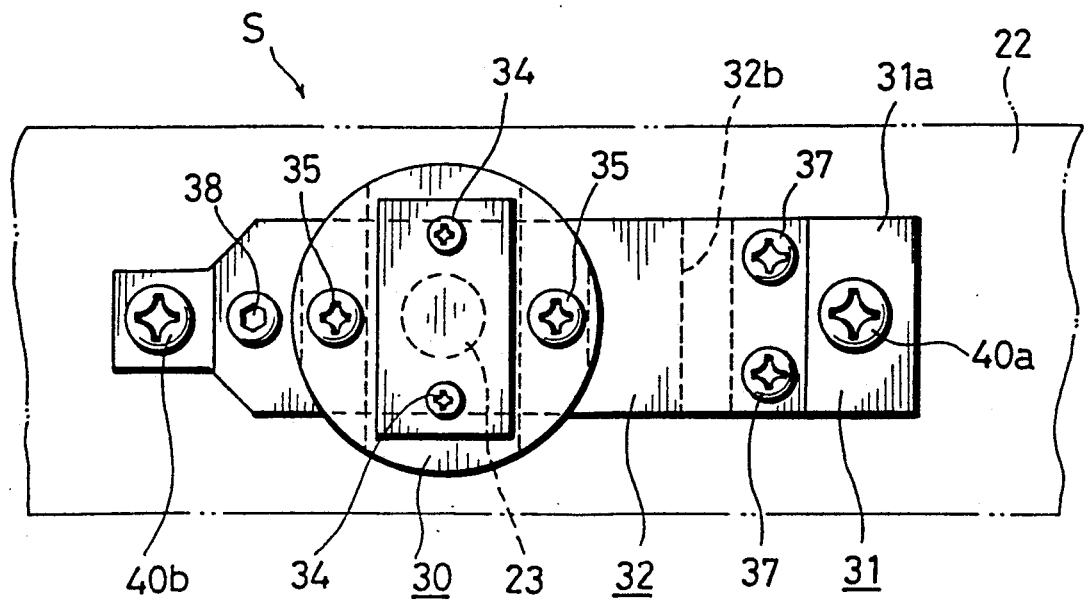
FIG. 5 is a side view of the above mechanism S.
Figure 6:
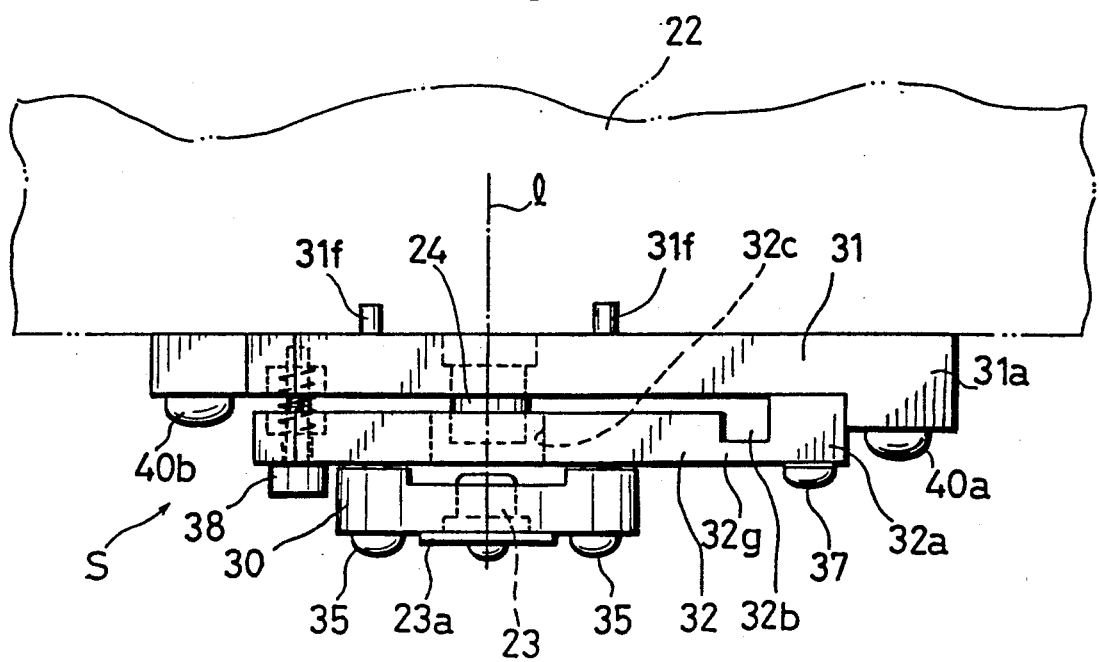
FIG. 6 is a plan view of the mechanism S.
Figure 7:
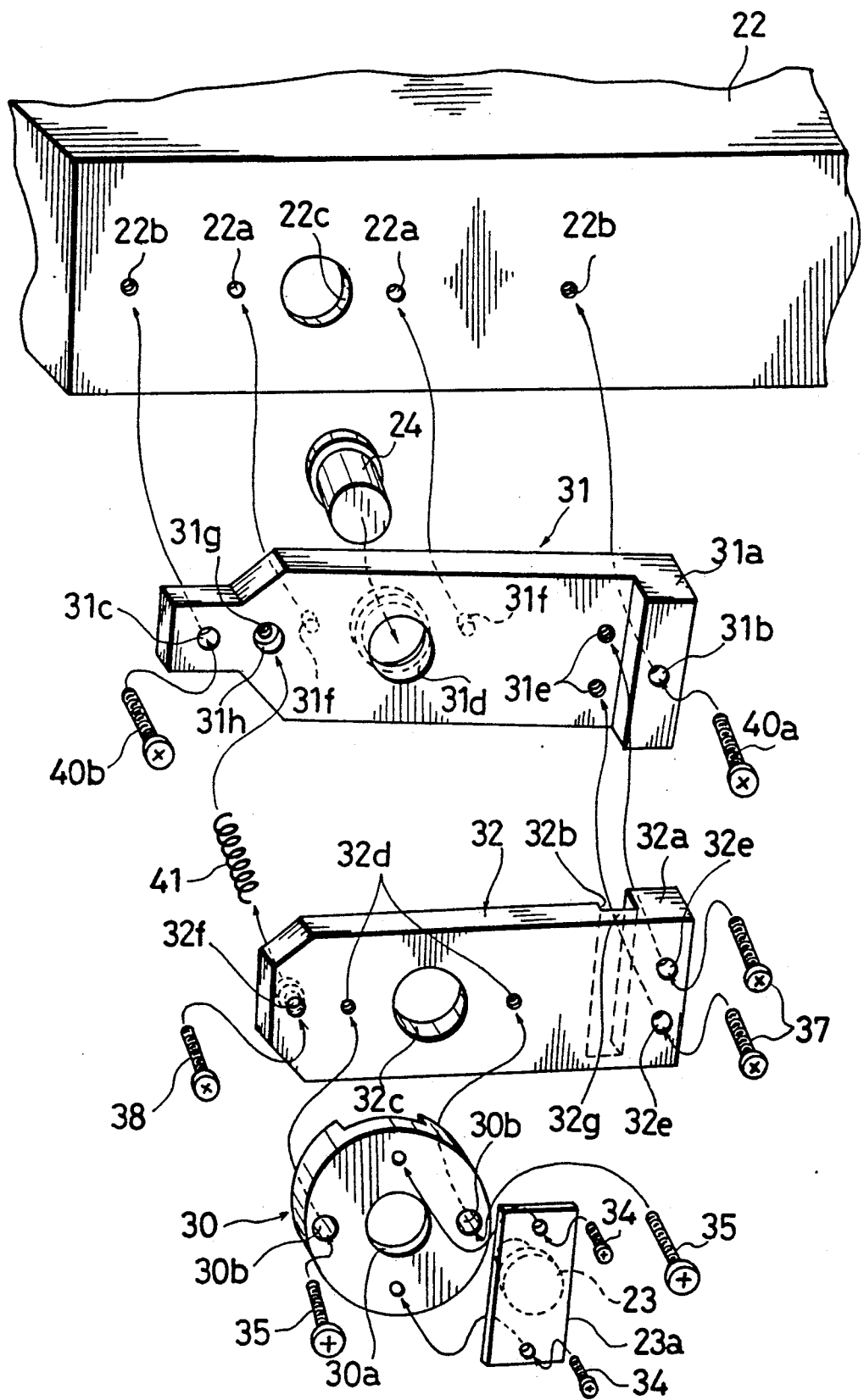
FIG. 7 is an exploded perspective view of the mechanism S.

FIGS. 5, 6 and 7 are a side view, a plan view and an exploded perspective view of the focus and optical axis adjustment mechanism S, respectively. The mechanism S comprises a first holding member 30 for holding the semiconductor laser 23, a second holding member 31 for holding the collimator lens 24 and an intermediate member 32 disposed between the first and second holding members 30 and 31. As will be described later, the first holding member 30 is attached to the intermediate member 32 so that it is movable within a plane vertical to the optical axis l of the laser beam. The intermediate member 32 is attached to the second holding member 31 so that it can be bent with a portion near one end thereof as the bending line.

Figure 8:
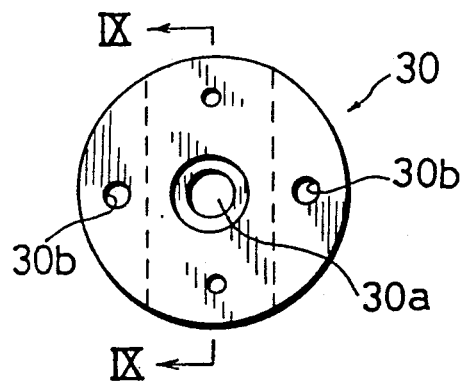
FIG. 8 is a front view of a first holding member 30.
Figure 9:
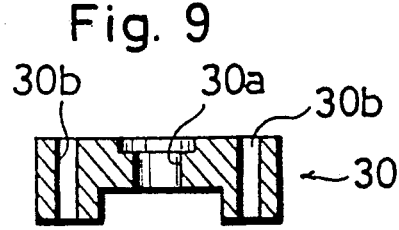
FIG. 9 is a cross section taken along the line IX—IX of FIG. 8.

FIG. 8 is a front view of the first holding member 30 and FIG. 9 is a cross section taken along the line IX—IX of FIG. 8. FIGS. 7 through 9 are also referred hereinafter. The first holding member 30 has a substantially circular shape and has at the center thereof a through hole 30a in which the semiconductor laser 23 is engaged. The semiconductor laser 23 is pressure contacted on a plate 23a and is fixed to the first holding member 30 by means of fixing screws 34. The first holding member 30 also has through holes 30b for receiving adjusting screws 35 loosely.

Figure 10:
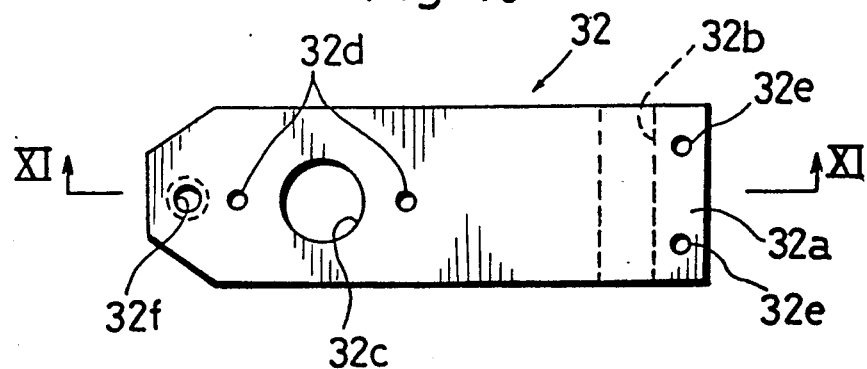
FIG. 10 is a front view of an intermediate member 32.
Figure 11:
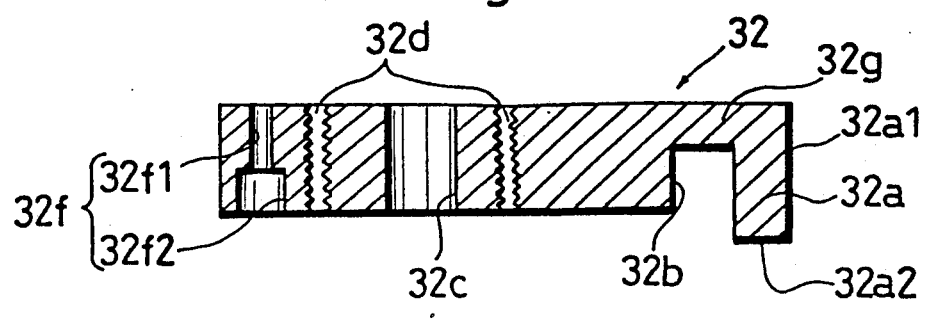
FIG. 11 is a cross section taken along the line XI—XI of FIG. 10.
Figure 14:
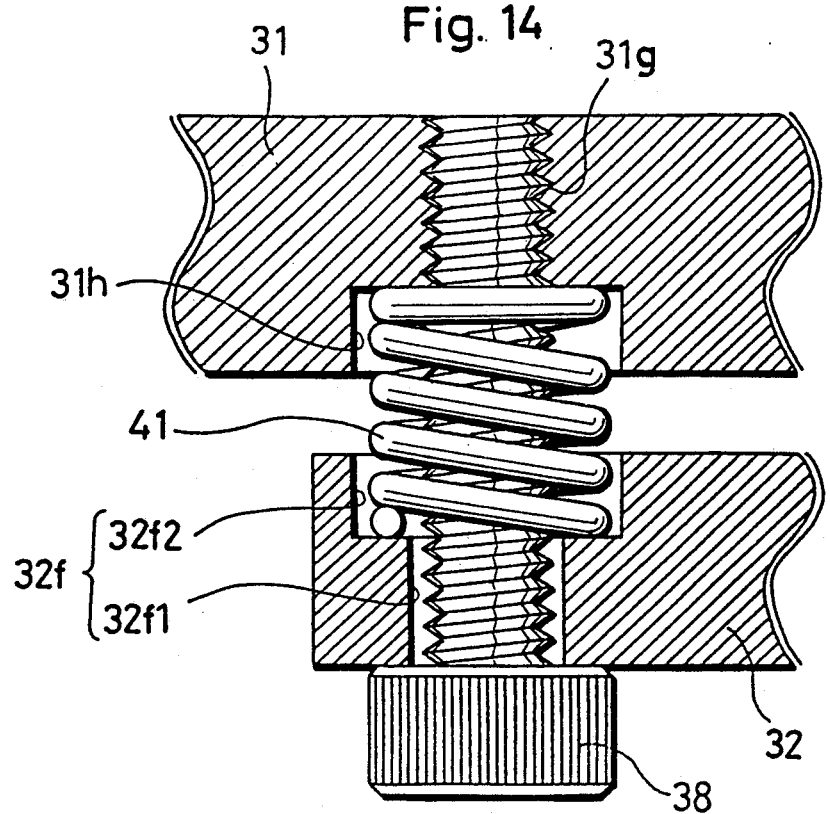
FIG. 14 is a view showing an attachment condition of a coil spring 41.

FIG. 10 is a front view of the intermediate member 32 and FIG. 11 is a cross section taken along the line XI—XI of FIG. 10. FIGS. 5 through 7 are also referred hereinafter. The intermediate member 32 is of a substantially rectangular shape and has a projecting portion 32a at one end thereof (righthand in FIGS. 10 and 11). The projecting portion 32a projects toward the second holding member 31 and has through holes 32e into which fixing screws 37 are inserted. The intermediate member 32 also has a groove 32b extending in the transverse direction thereof. A portion 32g defined by the groove 32b is thinner than the remaining portion, which allows the intermediate member to bend at the time of the focus The intermediate member 32 has a center hole 32c in which the collimator lens 24 is partially engaged. Interposing this center hole 32c are screw holes 32d into which the adjusting screws 35 are screwed. At the other end of the intermediate member 32 (lefthand in FIGS. 10 and 11), is provided a through hole 32f into which a focus adjusting screw 38 is inserted. As shown in FIG. 14, the through hole 32f consists of a portion 32f1 having a small diameter and a portion 32f2 having a large diameter in which a coil spring 41 is partially engaged.

Figure 12:
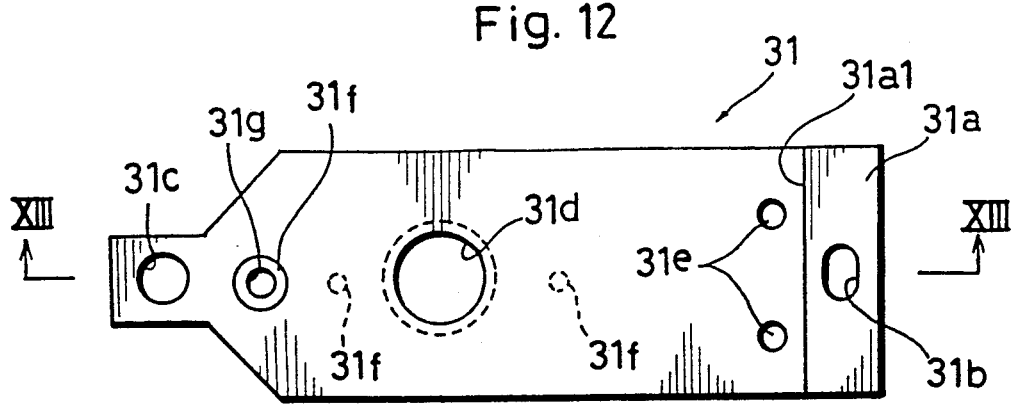
FIG. 12 is a front view of a second holding member 31.
Figure 13:
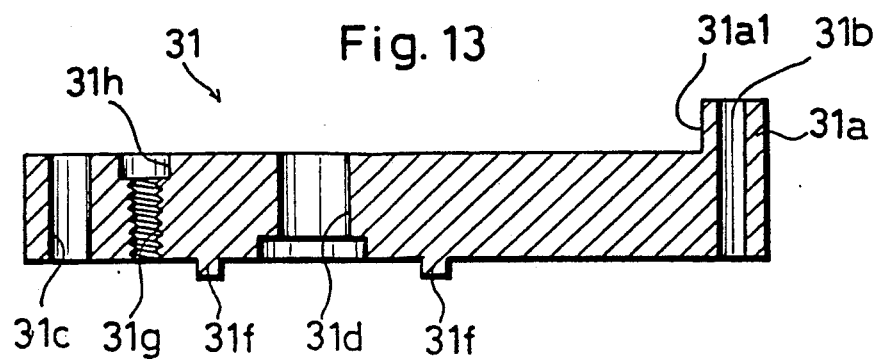
FIG. 13 is a cross section taken along the line XIII—XIII of FIG. 12.

FIG. 12 is a front view of the second holding member 31 and FIG. 13 is a cross section taken along the line XIII—XIII of FIG. 12. FIGS. 5 through 7 are also referred hereinafter. The second holding member 31 is of a substantially rectangular shape and has a projecting portion 31a at one end thereof (righthand in FIGS. 12 and 13). The projecting portion 31a projects toward the intermediate member 32 and has a through hole 31b into which a fixing screw 40a is inserted. The second holding member 31 also has at the other end thereof a through hole 31c into which a fixing screw 40b is inserted. The second holding member 31 has a mounting hole 31d for mounting the collimator lens 24 and screw holes 31e into which the fixing screws 37 are screwed. A pair of positioning lugs 31f are formed on the surface opposed to the case 22 of the second holding member 31. The case 22 has on its side wall a pair of positioning holes 22a in which the positioning lugs 31f are respectively engaged. The second holding member 31 has, as shown in FIG. 14, a screw hole 31g into which the adjusting screw 38 is screwed and a screw mounting hole 31h extended from the screw hole 31g. The coil spring 41 is partially engaged in this screw mounting hole 31h. One end of the coil spring 41 is in contact with a step of the through hole 32f and the other end is in contact with the bottom of the screw mounting hole 31h. Since the coil spring 41 is a compression coil, the intermediate member 32 and second holding member 31 are energized to be separated from each other. The case 22 has screw holes 22b into which the fixing screws 40a and 40b are screwed and a hole 22c through which the laser beam passes.

An assembly of the mechanism S having the above construction will be explained below.

First, the second holding member 31 is attached to the case 22. The collimator lens 24 is inserted through the mounting hole 31d. Then, the second holding member 31 is positioned on the side wall of the case 22 in such a manner that the positioning lugs 31f are engaged in the positioning holes 22a. The fixing screws 40a and 40b are respectively inserted through the through holes 31b and 31c, and are screwed into the screw holes 22b of the case 22. Second, the first holding member 30 is attached to the intermediate member 32. The semiconductor laser 23 is fixed to the first holding member 30. Then, the adjusting screws 35 are inserted through the through holes 30b and screwed into the screw holes 32d. Third, the intermediate member 32 is attached to the second holding member 31. An end face 32a1 of the projecting portion 32a (refer to FIGS. 10 and 11) is brought into contact with an end face 31a1 of the projecting portion 31a (refer to FIGS. 12 and 13), and a rear end face 32a2 of the projecting portion 32a (refer to FIG. 11) is brought into contact with a front surface of the second holding member 31. Under this condition, the screws 37 are inserted through the through holes 32e and screwed into the screw holes 31e of the second holding member 31. Then, the screw 38 is inserted through the through hole 32f and through the coil spring 41, and screwed into the screw hole 31g in order to attach the intermediate member 32 to the second holding member 31 with space therebetween. In this way, the mechanism S is attached to the side wall of the case 22.

The focus adjustment and the optical axis adjustment by this mechanism S will be described hereinafter. First, in effecting the optical axis adjustment, the screws 35 are loosened to allow the first holding member 30 to move within the plane vertical to the optical axis 1. After the first holding member 30 is placed at a desired position, the screws 35 are tightened to fix the first holding member 30 to the intermediate member 32. Next, in effecting the focus adjustment, the screw 38 is loosened or tightened. When the screw 38 is tightened, the intermediate member 32 approaches the second holding member 31 against a spring force of the coil spring 41. On the other hand, when the screw 38 is loosened, the intermediate member 32 is separated from the second holding member 31 by the spring force of the coil spring 41. At this time, since the portion 32g is thinner than the remaining portion, it acts as the bending line. That is, the intermediate member 32 is bent by operating the screw 38. The distance between the semiconductor laser 23 and the collimator lens 24 varies with this bending motion. Since the intermediate member 32 has the center hole 32c and the portion 32g near the opposite ends thereof, the distance between the optical axis 1 and the bending line is relatively long. Therefore, the position of the semiconductor laser on the plane vertical to the optical axis is hardly affected by the focus adjustment.

As described above, according to the present invention, the optical axis adjustment is effected between the first holding member 30 and the intermediate member 32, and the focus adjustment is between the intermediate member 32 and the second holding member 31. Therefore, these two adjustments can be effected individually. Further, these adjustments can be effected with a driver only and require no particular jig.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A focus and optical axis adjustment mechanism for two optical components comprising:
    a first holding member for holding a first optical component;
    a second holding member for holding a second optical component; and
    a flexible intermediate member disposed between said first and second optical components and to which said first holding member is movably attached within a plane vertical to an optical axis of the second optical component for adjustably positioning the first optical component on said optical axis of the second optical component, and which is fixed to said second holding member at a position apart form the position where the first optical component is attached to said intermediate member via the first holding member, whereby the intermediate member has a section of reduced thickness relative to the remaining portions and offset from said optical axis to enable the intermediate member to bend about the reduced thickness section, and is provided with sufficient flexibility to permit an adjustment of the distance between the first and second optical components through the movement of the intermediate member along the optical axis.

2. A mechanism as claimed in claim 1, wherein said first optical component is a semiconductor laser and wherein said second optical component is a collimator lens.

3. A mechanism as claimed in claim 1, wherein said intermediate member is of a substantially rectangular shape and is engaged with said first and second holding members at positions near opposite ends thereof in a longitudinal direction.

4. A mechanism as claimed in claim 1, further including means for allowing said first holding member, attached to said intermediate member, to move within a plane vertical to the optical axis of said second optical component includes screws for fixing said first holding member to said intermediate member and through holes for receiving said screws loosely.

5. A mechanism as claimed in claim 1, wherein said intermediate member has a hole through which said first and second optical components face each other.

6. A mechanism as claimed in claim 1, including a coil spring and a screw member, wherein said intermediate member and second holding member are separated from each other by the force of the coil spring and can approach each other by means of movement of the screw member.

7. A mechanism as claimed in claim 1, wherein said intermediate member has said first holding member attached thereto at a position near the opposite end from its reduced thickness section.

8. In a laser scanning apparatus for use in laser printers having a semiconductor laser and a collimator lens, the improvement comprising:
  a first holder member capable of operatively mounting one of the laser and the lens;
  a second holder member capable of operatively mounting the other of the laser and the lens;
  means for providing a force between the respective holder members adjacent one end of the first holder member, including an intermediate member, and
  means for fixedly holding the intermediate member adjacent the other end of the first holder member, so that the intermediate member is cantilevered to extend in an approximately overlapping manner, the cantilevered intermediate member having a second of a sufficient reduction in thickness to permit a pivotal bending adjustment, the intermediate member operatively supporting the second holder member, whereby the laser and collimator lens can be movably adjusted for alignment.

9. In a laser scanning apparatus for use in laser printers having a semiconductor laser and a collimator lens, the improvement comprising:
  a first elongated holder member capable of operatively mounting one of the laser and the lens;
  a second elongated holder member capable of operatively mounting the other of the laser and the lens;
  means for providing a force and
  means for supporting the second holder member, including an intermediate member secured adjacent the other end of the first holder member, so that the second holder member is cantilevered by the intermediate member to extend in an approximately overlapping manner over the first holder member, the force means being positioned to apply a force to the intermediate member, and the respective holder members position the laser and lens closer to the force means than the other end of the first holder member, the cantilevered intermediate member having a section of a sufficient reduction in thickness to permit a pivotal bending adjustment, the reduced section being positioned adjacent the other end of the first holder member, whereby the laser and collimator lens can be relatively movably adjusted for alignment.

10. A focus and optical axis adjustment mechanism for two optical components comprising:
  a first holding member for holding a first optical component;
  a second holding member for holding a second optical component;
  a flexible intermediate member disposed between said first and second optical components and to which said first holding member is movably attached within a plane vertical to an optical axis of the second optical component for adjustably positioning the first optical component on said optical axis of the second optical component, and which is fixed to said second holding member at a position apart form the position where the first optical component is attached to said intermediate member via the first holding member,
  a coil spring, and
  a screw member, the intermediate member having a section of a sufficient reduction in thickness to permit a pivotal bending adjustment to enable an adjustment of the distance between the first and second optical components through the movement of the intermediate member along the optical axis, wherein said intermediate member and second holding member are separated from each other by the force of the coil spring and can approach each other by means of movement of the screw member, the coil spring and screw member being mounted between the intermediate member and the second holding member at one end of the intermediate member and the reduced thickness section being positioned closer to the other end.

* * * * *